Patented Jan. 13, 1925.

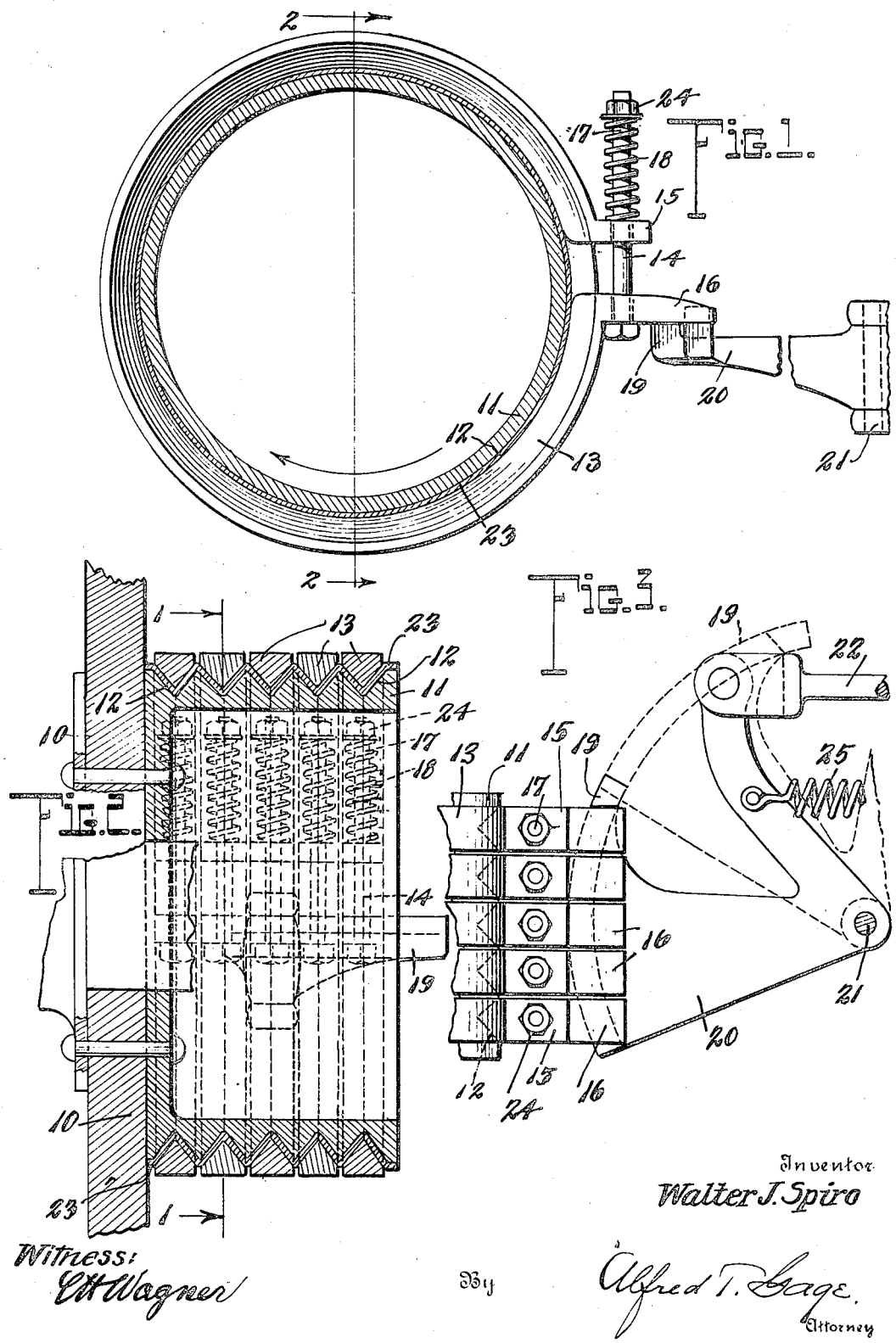

1,523,303

UNITED STATES PATENT OFFICE.

WALTER J. SPIRO, OF WHITE PLAINS, NEW YORK.

FRICTION BRAKE.

Application filed September 21, 1923. Serial No. 664,012.

*To all whom it may concern:*

Be it known that I, WALTER J. SPIRO, citizen of the United States, residing at White Plains, in the county of Westchester and State of New York, have invented certain new and useful Improvements in Friction Brakes, of which the following is a specification.

This invention relates to a friction brake and particularly to a construction in which the degree of friction applied for braking purposes may be accurately determined and the operator relieved from any strain in holding the brake when in use.

In prior constructions of friction brakes, especially those of a drum and strap type, it has been practically impossible to secure continuous contact between the frictional braking faces and this resulted in uneven wear and general deterioration of the brake band. Such brakes when controlled by a foot pedal placed a severe strain upon the operator necessary to hold the braking surfaces in proper contact. Unless constantly and carefully adjusted brakes of this character are subject to uneven action resulting in difficulty in stopping and frequent skidding of a vehicle.

To overcome these objections the present invention provides a novel and improved construction in which the friction members are normally held in contact for joint rotation and the travel of one of the members is interrupted to effect a relative movement between the members during the braking action.

A further object of the invention is to present a structure embodying a movable member having frictionally clamped thereon a plurality of braking devices, together with means by which one or more of such devices may be independently or successively held against travel with the movable member.

Another object of the invention is to provide a rotatable drum having thereon a series of independent brake bands clamped at a braking tension and disposed to cooperate with a movable stop to engage said bands and increase the tension thereof while retaining them against movement with the drum.

An additional object of the invention is to present an improved construction of drum having peripheral grooves in which a series of independent brake bands are seated and frictionally clamped to rotate with the drum, together with a movable stop arm disposed to successively engage all of said bands to retain the same against rotation with the drum.

Other and further objects and advantages of the invention will be hereinafter set forth and the novel features thereof defined by the appended claims.

In the drawing—

Figure 1 is a vertical section on line 1—1 of Fig. 2;

Figure 2 is a section on line 2—2 of Fig. 1; and

Figure 3 is a detail plan of the stop lugs and arm.

Like numerals refer to like parts in the several figures of the drawing.

The invention is capable of embodiment in many different structures and as illustrating one form thereof it is herein disclosed in connection with a friction drum and band type of brake. In this application of the principle involved, the numeral 10 designates a wheel or other rotatable member carrying a drum 11 which is herein shown as provided with a series of grooves or channels 12 to increase the area of the braking surface and retain the cooperating braking member against displacement. These grooves may be of any desired configuration, preferably V-shaped, to cooperate with a series of friction bands 13 of similar cross section and clamped within the grooves by an adjustable tension device 14. This device may comprise parallel outwardly extending clamping lugs 15 and 16 connected by a bolt 17 having a tension spring 18 disposed between its adjustable nut 24 and the lug 15. This effects a yielding tension between the band and drum not only to cause their joint rotation, but is also set to determine the normal frictional resistance for the brake.

The lug 16 from the band is extended to cooperate with a movable stop member 19 which may be of any desired character mounted upon a fixed support to successively engage the lugs upon the series of bands. This member is herein shown as a crank lever 20 pivoted at 21 to swing across the path of all of the lugs and provided with a connection 22 extending to an operating means. If desired the stop lever may be restored and held in its initial position, as shown by dotted lines in Figure 3, by means of a spring 25.

The invention is designed for application to any type of friction brake, but is particularly adapted for use as a wheel brake upon motor vehicles and in connection with a four wheel brake system. The clamping of the band upon the drum establishes an extended continuous frictional contact therewith which effects the most efficient braking action and reduces the wear of the parts to a minimum. The adjustment of the band clamp produces a proper and even braking resistance between the parts and relieves the operating connections from all strain in the application of the brakes as this is taken by the rigid mounting of the stop arm. The contact of this arm with the band not only retains the same against rotation with the drum, but also forces the lugs together and increases the frictional resistance as the brake is initially applied. The grooved faces of the drum provide a material increase in the friction area and the seating of the bands in these grooves produces a continuous gripping surface most effective in the operation of the brake.

This construction of brake is self equalizing when applied to different wheels of a vehicle as the tension bolts for the bands may be set to apply an equal braking force to each wheel when an equal number of straps are used. When the brake is not applied no friction is generated and there is no drag of the parts. The operation of the brake effects a progressive increase in the braking force or retardation by the successive engagement of the stop with the bands so as to apply the desired amount of frictional resistance to the revolution of the wheels. For a quick stop the arm is thrown into engagement with all the bands to secure the maximum frictional resistance while for a slight retardation the stop is only moved into the path of one band. The invention is readily applicable to existing automobile constructions without material changes therein.

One form of brake embodying the invention has been specifically shown and described, but the invention is not confined thereto as changes and alterations may be made therein without departing from the spirit thereof as recited in the following claims.

What I claim is—

1. A friction brake for a vehicle wheel comprising a brake member secured thereto, a plurality of braking members frictionally engaged with the secured member for rotative movement thereon during the braking action, and means cooperating with the braking members for varying the degree of friction thereof during the braking operation.

2. A friction brake for vehicle wheels comprising a member secured thereto for rotation therewith, a plurality of cooperating braking members frictionally engaged with the secured member to permit relative movement, and means upon the chassis of the vehicle fixed against revolution and shiftable for holding one or more of said braking members to determine the extent of the braking action and permit continued travel of the secured member.

3. A friction brake for a vehicle wheel comprising a member secured thereto for rotation therewith, a plurality of cooperating braking members frictionally engaged with the secured member to permit relative movement, and a pivoted brake actuator upon the chassis of the vehicle fixed against revolution and shiftable to successively hold one or more of said braking members and permit continued travel of the secured member.

4. The combination with a traction wheel, of a friction brake member secured thereon, cooperating brake members mounted to engage the secured member and permit relative movement thereof, and means upon the chassis of the vehicle fixed against revolution and shiftable to hold one or more of the cooperating brake members while permitting continued rotation of the secured member.

5. In a friction brake, a rotatable member, a cooperating braking member held in yielding frictional engagement therewith, and stop means to engage said braking member and increase its frictional contact with the rotatable member.

6. In a friction brake, a rotatable drum, a series of bands clamped thereon for relative movement of joint rotation, and stop means disposed to successively engage said bands to determine the extent of the braking action and permit independent movement of the drum.

7. In a friction brake, a rotatable drum, a band mounted thereon, means for determining the normal frictional engagement between the band and drum, and means to retain the band against movement with the drum and increase its frictional engagement therewith.

8. In a friction brake, a drum provided with a series of peripheral channels, brake bands disposed therein and mounted to permit independent movement of the drum, and a stop arm adapted to be disposed in the path of a member from one or more of said bands.

9. In a friction brake, a drum provided with a series of peripheral channels, brake bands disposed therein and mounted to permit independent movement of the drum, a brake lining interposed between said drum and bands, and means to retain one or more of said bands against movement with the drum.

10. In a friction brake, a drum provided with a peripheral channel, an open brake band disposed therein, tension means connecting the ends of said band to permit independent movement of the drum, and means to engage and retain the band against movement with the drum.

11. In a friction brake, a drum, an open brake band disposed thereon and having outwardly disposed lugs at its free ends, a spring tensioned bolt connecting said lugs, and a stop arm disposed to engage one of said lugs to retain the band against movement.

12. In a friction brake, a drum provided with a series of peripheral grooves, a series of brake bands seated in and conforming to said grooves, means for maintaining a frictional tension between said bands and drum to permit independent movement of the drum in the braking action, and stop means mounted to engage and retain one or more of said bands.

13. In a friction brake, a drum provided with a series of peripheral grooves, a series of brake bands seated in said grooves, means for maintaining a frictional tension between the bands and drum to permit independent movement of the drum in the braking action, an extended stop member from a free end of each of said bands, and a pivoted stop arm disposed to swing into the path of one or more of said members.

14. In a friction brake, a drum provided with a series of peripheral grooves, a series of brake bands seated in said grooves, lugs from the free ends of said bands, a tension bolt connecting the lugs to normally clamp the bands upon the drum, and stop means disposed in the path of one of said lugs to force it toward the other lug and increase the clamping tension when retaining the band against rotation with the drum.

In testimony whereof I affix my signature.

WALTER J. SPIRO.